United States Patent

Michalakis et al.

(10) Patent No.: US 10,816,972 B2
(45) Date of Patent: Oct. 27, 2020

(54) COLLECTIVE DETERMINATION AMONG AUTONOMOUS VEHICLES

(71) Applicant: TOYOTA RESEARCH INSTITUTE, INC., Los Altos, CA (US)

(72) Inventors: Nikolaos Michalakis, Saratoga, CA (US); Julian M. Mason, Redwood City, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 113 days.

(21) Appl. No.: 15/459,305

(22) Filed: Mar. 15, 2017

(65) Prior Publication Data

US 2018/0268698 A1   Sep. 20, 2018

(51) Int. Cl.
| | |
|---|---|
| *G05D 1/00* | (2006.01) |
| *B60W 40/02* | (2006.01) |
| *G08G 1/00* | (2006.01) |
| *G08G 1/0967* | (2006.01) |
| *G08G 1/01* | (2006.01) |
| *G08G 1/16* | (2006.01) |

(52) U.S. Cl.
CPC .......... *G05D 1/0088* (2013.01); *B60W 40/02* (2013.01); *G08G 1/0112* (2013.01); *G08G 1/096791* (2013.01); *G08G 1/162* (2013.01); *G08G 1/22* (2013.01)

(58) Field of Classification Search
CPC .......... G05D 1/00; G05D 1/162; G05D 1/22; G05D 1/0112; G05D 1/0088; G05D 1/0287; B60W 40/02

USPC .......................................................... 701/23
See application file for complete search history.

(56) References Cited

U.S. PATENT DOCUMENTS

| | | | |
|---|---|---|---|
| 6,615,137 B2 * | 9/2003 | Lutter .................. | G08G 1/0965 340/436 |
| 7,057,499 B2 | 6/2006 | Kanemitsu | |
| 7,994,902 B2 * | 8/2011 | Avery .................... | G08G 1/161 340/435 |

(Continued)

OTHER PUBLICATIONS

Nikolaos Michalakis, et al., "Ensuring Content Integrity for Untrusted Peer-to-Peer Content Distribution Networks", USENIX Association, 4th USENIX Symposium on Networked Systems Design & Implementation, NSDI, 2007, pp. 145-158.

(Continued)

*Primary Examiner* — Tan Q Nguyen
(74) *Attorney, Agent, or Firm* — Oblon, McClelland, Maier & Neustadt, L.L.P.

(57) ABSTRACT

Aspects of the disclosure provide a method for collectively determining an object by a group of vehicles. The method can include receiving sensor data indicating an object at a first vehicle of the group of vehicles communicating with each other, determining the object to reach a first conclusion based on the sensor data at the first vehicle, transmitting the sensor data and the first conclusion to second vehicles of the group of vehicles from the first vehicle, determining the object to reach a second conclusion at each second vehicle based on the sensor data, transmitting second conclusions from the respective second vehicles to the other second vehicles and the first vehicle, and determining the object based on the first and second conclusions at the first vehicle or the second vehicles.

15 Claims, 5 Drawing Sheets

(56) References Cited

U.S. PATENT DOCUMENTS

| | | | | |
|---|---|---|---|---|
| 8,229,663 | B2* | 7/2012 | Zeng | B60W 40/02 |
| | | | | 180/168 |
| 8,362,889 | B2 | 1/2013 | Komori | |
| 8,825,356 | B2 | 9/2014 | Vorona | |
| 9,047,773 | B2 | 6/2015 | Chen et al. | |
| 9,117,371 | B2* | 8/2015 | Hutchings | G08G 1/096791 |
| 9,261,882 | B2* | 2/2016 | Kim | G05D 1/0287 |
| 9,316,718 | B2* | 4/2016 | Stahlin | H04L 67/12 |
| 9,355,423 | B1 | 5/2016 | Slusar | |
| 9,776,632 | B2* | 10/2017 | Bowers | B60W 30/0956 |
| 9,830,814 | B2* | 11/2017 | Thompson | G08G 1/04 |
| 9,922,565 | B2* | 3/2018 | Thomas | G06K 9/00798 |
| 2002/0198660 | A1* | 12/2002 | Lutter | G08G 1/0965 |
| | | | | 701/301 |
| 2010/0198513 | A1* | 8/2010 | Zeng | B60W 40/02 |
| | | | | 701/300 |
| 2010/0214085 | A1* | 8/2010 | Avery | G08G 1/161 |
| | | | | 340/435 |
| 2013/0151088 | A1 | 6/2013 | Ricci | |
| 2013/0342333 | A1* | 12/2013 | Hutchings | G08G 1/096791 |
| | | | | 340/435 |
| 2015/0241880 | A1* | 8/2015 | Kim | G05D 1/0287 |
| | | | | 701/25 |
| 2015/0254986 | A1* | 9/2015 | Fairfield | G08G 1/22 |
| | | | | 707/687 |
| 2015/0269845 | A1 | 9/2015 | Calmettes et al. | |
| 2016/0071418 | A1 | 3/2016 | Oshida et al. | |
| 2016/0295589 | A1* | 10/2016 | Nikopour | H04W 4/023 |
| 2016/0334805 | A1 | 11/2016 | Rothoff et al. | |
| 2018/0121740 | A1* | 5/2018 | Boss | B60T 8/17 |
| 2018/0121763 | A1* | 5/2018 | Surnilla | G06K 9/00805 |

OTHER PUBLICATIONS

Robert Grimm, et al., "System Support for Pervasive Applications", ACM Transactions on Computer Systems, vol. 22, No. 4, Nov. 2004, pp. 421-486.

"Trusted Computing", Wikipedia, https://en.wikipedia.org/wiki/Trusted_Computing, Oct. 21, 2016, 14 pages.

* cited by examiner

COLLECTIVE DETERMINATION AMONG AUTONOMOUS VEHICLES

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An autonomous vehicle may operate at different autonomous driving levels. For example, when at a basic level, an operator may execute full control of the vehicle. While at a fully autonomous level, the vehicle itself is capable of sensing its environment and navigating without human input. An autonomous vehicle can detect surroundings using a variety of techniques such as radar, lidar, GPS, odometry, and computer vision. A control system in the autonomous vehicle can interpret sensory information to identify obstacles and relevant signage as well as appropriate navigation paths. The U.S. Pat. No. 8,660,734 B2 patent disclosed an autonomous driving system enabling a vehicle to detect and react to surrounding objects.

SUMMARY

Aspects of the disclosure provide a method for collectively determining an object by a group of vehicles. The group of vehicles can collectively react to the detected object. The method can include receiving sensor data indicating an object at a first vehicle of the group of vehicles communicating with each other, determining the object to reach a first conclusion based on the sensor data at the first vehicle, transmitting the sensor data and the first conclusion to second vehicles of the group of vehicles from the first vehicle, determining the object to reach a second conclusion at each second vehicle based on the sensor data, transmitting second conclusions from the respective second vehicles to the other second vehicles and the first vehicle, and determining the object based on the first and second conclusions at the first vehicle or the second vehicles.

In one embodiment, the method further includes selecting ones of the group of vehicles as the second vehicles. In one example, vehicles having more computation resources than other vehicles in the group of vehicles are selected to be the second vehicles. In another example, vehicles whose communication channels to the first vehicle have lower communication delays than a threshold are selected to be the second vehicles. In a further example, vehicles of an auto maker the same as the first vehicle are selected to be the second vehicles.

In one embodiment, determining the object based on the first and second conclusions at the first vehicle or the second vehicles includes associating a weight to each of the first and second conclusions, and drawing a final conclusion based on the weighted first and second conclusions. In one example, the weight is determined based on computation resources of the vehicle drawing the respective conclusion, or a reputation of the vehicle drawing the respective conclusion.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide a process for collectively determining an object based on sensor data among a group of autonomous vehicles. For example, a group of vehicles are travelling along a road. Sensors on a first vehicle may generate sensor data indicating an object on a road. The object may be a pedestrian, an animal, a non-functional car, a construction site, an obstacle, a signage, and the like. The object may be more than one element. For example, a construction site on a road may include a sign and a construction region. The first vehicle may run an algorithm to determine the object based on the sensor data. A first conclusion about what the object is may be obtained. However, the first vehicle may not be confident about the first conclusion of determining the object. According to the process, the first vehicle may broadcast the first conclusion and the corresponding sensor data to nearby second vehicles via a wireless signal. The nearby second vehicles may run their own algorithms to draw a second conclusion based on the received sensor data, and broadcast second conclusions to surrounding vehicles. Finally, based on the first conclusion and second conclusions, each member of the group of vehicles, including both the first vehicle and nearby second vehicles, can make a final decision of the object with a higher confidence. Based on the final decision of the object, each member of the group of vehicles can accordingly take actions, forming a collective reaction to the detected object.

Figure 1:
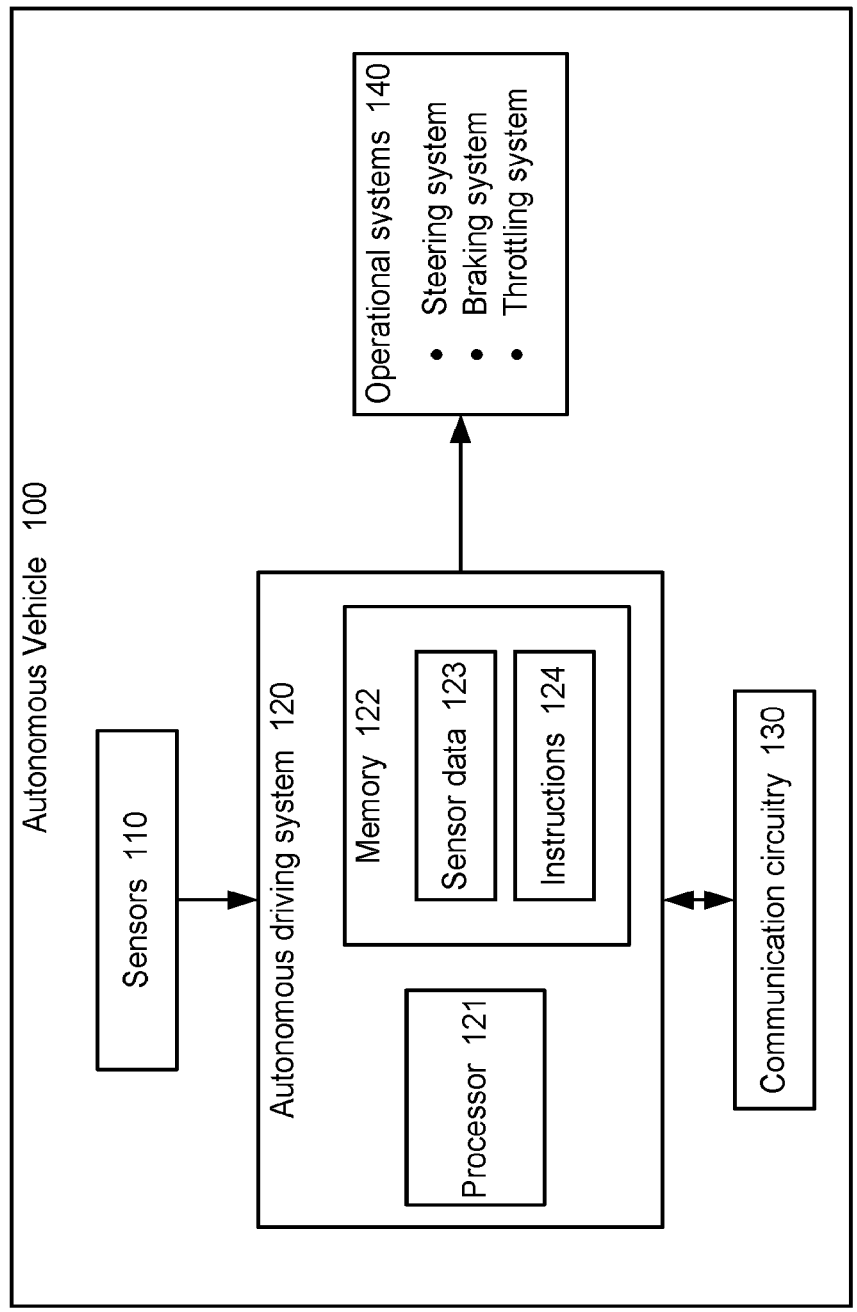
FIG. 1 shows an autonomous vehicle according to an example of the disclosure.

FIG. 1 shows an autonomous vehicle 100 according to an example of the disclosure. The autonomous vehicle 100 is capable of performing various driving functions automatically without a human intervention. The driving functions may include steering control, braking control, throttling control, and the like. The autonomous vehicle 100 can be any type of vehicle, such as cars, trucks, motorcycles, buses, boats, airplanes, trams, golf carts, trains, trolleys, and the like. In one example, the autonomous vehicle 100 includes sensors 110, an autonomous driving system 120, communication circuitry 130, and operational systems 140. These elements are coupled together as shown in FIG. 1.

The sensors 110 are configured to generate sensor data indicating road conditions. Road conditions refers to state of a road having impact on driving a vehicle, such as type of the road, traffic conditions, weather conditions, obstacles detected on the road, and the like. Particularly, the sensors 110 can include sensors configured to detect objects affecting driving operations of the autonomous vehicle 100. For example, the sensors for detecting objects can include cameras, lidars, radars, microphones, and the like to monitor the environment of the autonomous vehicle 100. The cameras can produce data of images or videos capturing an object in the environment of the vehicle. The cameras can include a rotate camera, a stereo optic camera, a single multidirectional camera, and the like. The lidars can be configured to sense a nearby or remote object. For example, the lidars can produce data indicating distance to an object by illuminating the object with a beam of laser light and create images of the object based on the data. The lidars can use ultraviolet, visible, or near infrared light to image objects. The lidars can target a wide range of materials, including non-metallic objects, rocks, rain, and the like. The radars can sense an object using radio signals. For example, the radars can generate data indicating a distance, speed, and heading of a moving object. The microphones can sense sounds from objects and produce data of sounds. For example, the microphones can sense a sound of a siren from an emergency vehicle, such as a police car, an ambulance vehicle, and the like, and generate respective data.

The sensors 110 may include other sensors for various purposes. For example, the sensors may include positioning sensors configured to provide data indication a location of the autonomous vehicle 100. In an example, the positioning sensors include a satellite positioning signal receiver, such as a Global Positioning System (GPS) receiver.

The autonomous driving system 120 is configured to automatically perform various driving functions according to road conditions. For example, a pedestrian may be crossing a road ahead of the autonomous vehicle 100 travelling on the road. The sensors 110 can capture the appearance of the pedestrian and generate sensor data indicating the appearance of an object. The autonomous driving system 120 can receive the sensor data and draw a conclusion that the detected object is a pedestrian. As a response to the conclusion, the autonomous driving system 120 can subsequently issue a driving operation command to the operational systems 140 to slow down the autonomous vehicle while approaching the pedestrian.

According to an aspect of the disclosure, the autonomous driving system 120 can employ a collective determination technique to determine what has happened in the environment of the vehicle based on the sensor data. For example, in addition to determining the object to reach a first conclusion about the detected object, the autonomous driving system 120 can transmit the sensor data to surrounding vehicles requesting the surrounding vehicles to determine the object to obtain second conclusions. Subsequently, the autonomous driving system 120 can draw a final conclusion about the detected object based on the first and second conclusions. In this way, a more accurate result of detecting an object can be achieved with the assistance from surrounding vehicles.

In one embodiment, the autonomous driving system 120 includes a processor 121 and a memory 122. The processor 121 is configured to perform the collective determination function.

In one example, the processor 121 is configured to first draw a first conclusion regarding an object captured by the sensors 110. For example, the cameras may capture an appearance of a pedestrian, and generate image data indicating the pedestrian. The processor 121 receives the image data from the cameras. Alternatively, the sensor data can be first stored in the memory 122, and read from the memory 122. The processor 121 can subsequently process the sensor data to determine what object has been sensed. In one example, the processor 121 includes image processing circuitry that can process the image data and extract features of an object. The processor 121 may further include image recognition circuitry, such as a neural network trained for recognizing different objects, to calculate a result of the sensed object. The processor 121 can therefore determine the object to be a pedestrian as an initial conclusion of the detection process. In another example, the processor 121 can execute instructions of an image processing and recognition program to process the sensor data. The instructions of respective programs may be stored in the memory 122. Alternatively, the processor 121 can trigger circuitry outside the processor 121 to process the sensor data to determine what object has been sensed.

The above example uses image data processing as an example to illustrate the process for drawing an initial conclusion of determining an object. However, other types of sensor data, such as data from the lidars, radars, microphones, and the like can also be used to determine a sensed object. Those sensor data can be used independently or in combination with other types of sensor data for determining an object. Accordingly, the processor 121 can include circuitry or execute programs suitable for processing different types of sensor data.

Next, after obtaining the first conclusion regarding the object sensed by the sensor 110, the processor 121 is further configured to request assistance from surrounding vehicles for determination of the object. Specifically, the processor 121 can transmit the sensor data indicating the object and the first conclusion of determining the object to other vehicles. For example, the autonomous vehicle 100 can communicate with other vehicles via the communication circuitry 130. The processor 121 can select vehicles from surrounding vehicles to send the request. For example, the selected vehicles may have stronger computational power among the group of vehicles, or be equipped with more sophisticated computation models or software. The selected vehicles can receive the sensor data and determine the object to reach a second conclusion at each selected vehicle based on the sensor data. Different algorithms may be employed at the selected vehicles. The selected vehicles can then transmit the second conclusions to the autonomous vehicle 100.

Subsequently, the processor 121 can be further configured to receive the second conclusions from surrounding vehicles and draw a final conclusion based on the second conclusions and the first conclusions. For example, different weights can be associated with the first and second conclusions depending on, for example, computation capabilities of respective vehicles, reputations of respective vehicles, or other factors.

In a further example, another vehicle senses an object and produces sensor data indicating the object. The processor 121 can be configured to assist the other vehicle to determine the object. Specifically, the processor 121 can receive sensor data and a first conclusion drawn based on the sensor data from the other vehicle. The processor 121 can determine the object to reach a second conclusion based on the sensor data in a way similar for processing the sensor data from the sensors 110. The processor 121 can then transmit the second conclusion to the other vehicle which may draw a final conclusion based on the first and second conclusion. In addition, the processor 121 may also broadcast the second conclusion to other surrounding vehicles. The other surrounding vehicles may similarly receive the sensor data from the other vehicle and process the sensor data to draw a second conclusion, and then broadcast the second conclusion. Accordingly, the processor 121 can receive second conclusions from other surrounding vehicles, and draw a final conclusion about what object has been detected based on the received second conclusions, and the first conclusion from the other vehicle.

The processor 121 can be implemented with any suitable software and hardware in various embodiments. In one example, the processor 121 includes one or more microprocessors which execute instructions stored in the memory 122 to perform functions described above. In one example, the processor 121 includes integrated circuits (IC), such as application specific integrated circuits (ASIC), field programmable gate arrays (FPGA), and the like.

In one example, the memory 122 is configured to store various sensor data 123. The various sensor data 123 may include sensor data generated from the sensors 110 at the autonomous vehicle 100 or sensor data received from surrounding vehicles. The memory 122 may be further configured to store instructions 124 of various programs. For example, the various programs may include programs implementing algorithms for processing the various sensor data to determine a sensed object. The various programs may also include programs implementing the collective determination technique. Further, the various programs may include other programs implementing other autonomous driving functions of the autonomous driving system 120. The instructions 124, when executed by the processor 121 or other processors in the autonomous driving system 120, causes the processor 121 or other processors to carry out various functions of the autonomous driving system 120. The memory 122 may be any type of memories capable of storing instructions and data, such as hard drive, ROM, RAM, flash memory, DVD, and the like.

The communication circuitry 130 is configured to provide a wireless communication channel between the autonomous vehicle 100 and other vehicles. In one example, the communication circuitry 130 can be configured to wirelessly communicate with communication circuitry in other vehicles via a wireless network, such as an LTE network, a WiMAX network, a CDMA network, a GSM network, and the like. Additionally or alternatively, the communication circuitry 130 can be configured to communicate with communication circuitry in other vehicles directly using suitable technologies, such as Wi-Fi, Bluetooth, ZigBee, dedicated short range communications (DSRC), and the like. In one example, a wireless channel between the autonomous vehicle 100 and another surrounding vehicle can be established via one or more surrounding vehicles which relay messages through the wireless channel.

The operational systems 140 include a steering system, a braking system, a throttling system, and the like in one example. Each system in the operational systems can include relays, motors, solenoids, pumps, and the like, and performs driving functions in response to control signals received from the autonomous driving system 120. Thus, autonomous driving functions can be realized.

Figure 2:
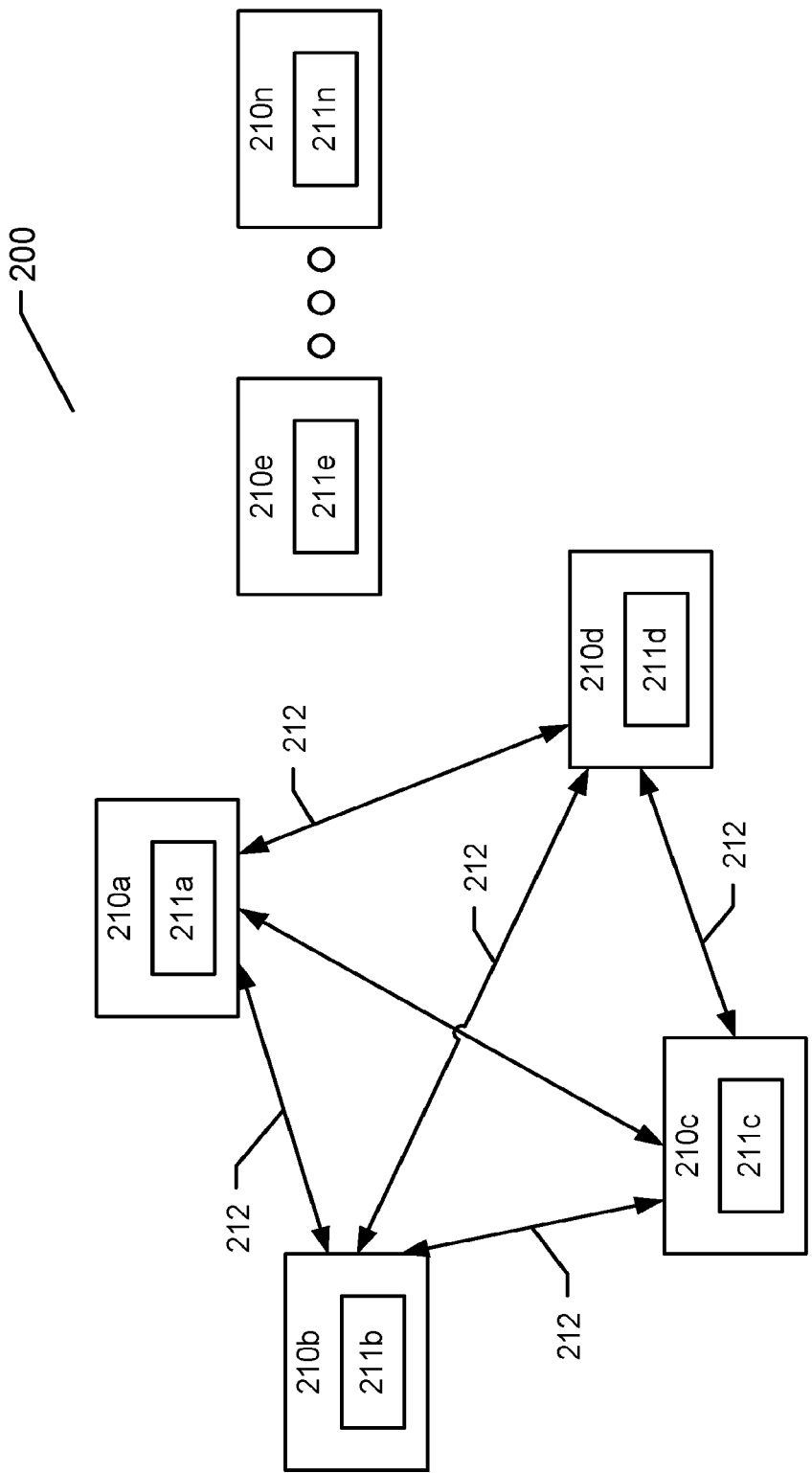
FIG. 2 shows a group of vehicles implementing a collective determination technique according to an embodiment of the disclosure.

FIG. 2 shows a group of vehicles 200 implementing the collective determination technique according to an embodiment of the disclosure. The group of vehicles 200 includes multiple vehicles 210a-210n. The group of vehicles 200 can communicate with each other. For example, the group of vehicles 200 can communicate through a cellular network. Alternatively, the group of vehicles 200 can form a wireless ad hoc network and communicate with each other through the ad hoc network. Wireless channels can thus be established between members of the group of vehicles 200. Wireless channels 212 between vehicles 210a-210d are shown in FIG. 2, while other wireless channels are not shown.

Structures and functions of each of the group of vehicles 200 can be similar to that of the vehicle 100 in FIG. 1 example. For example, each of the group of vehicles 200 may include a processor 211a-211n. The processor 211a-211n can perform functions similar to the processor 121 in FIG. 1 example to carry out a collective determination process to determine an object, and subsequently react to a detected object. However, the group of vehicles 200 is not required to have the same structures or functions in order to implement the collective determination technique. For example, members of the group of vehicles 200 may be equipped with different sensors having different capabilities. Members of the group of vehicles 200 may have different computation resources (for example, different number of processors with varied computational power) and may run different algorithms for detecting an object. Members of the group of vehicles 200 may be products of different auto makers, and may or may not have the capability to operate autonomously.

Assuming the group of vehicles 200 form a caravan travelling along a road, and the vehicle 210a captures appearance of an object on the road through its sensors, the group of vehicles 200 can then collectively perform a determination process to determine what object has been detected, and collectively react to the detected object. The collective determination process can include three phases.

During a first phase, the vehicle 210a captures appearance of an object with its sensors and determines the object to reach a first conclusion. Specifically, sensor data indicating the object can be generated from one or multiple sensors at the vehicle 210a. The processor 210 can then process the sensor data to determine what object has been captured in the sensor data. A first algorithm for processing the sensor data may be employed. As a result of this determination operation, a first conclusion can be reached, and, for example, the object is determined to be a non-functional vehicle. Then, the vehicle 210a can transmit the sensor data and the first conclusion to surrounding vehicles.

In some examples, the vehicle 210a may select part of the group of vehicles 200 to transmit the sensor data and the first conclusion. The selection may be based on one or more factors. In one example, the vehicle 210a may choose vehicles whose wireless communication channels to the vehicle 210a have the least transmission delays or are lower than a threshold. The transmission delays can be measured and obtained while the group of vehicles 200 establishing and maintaining the communication channels between each other by communication circuitry (such as the communication circuitry 130 in FIG. 1) in each vehicle.

In another example, the vehicle 210a may choose vehicles having more computation resources among the group of vehicles. For example, some vehicles in the group of vehicles 200 may have more powerful processors. During an object determination process, those more powerful processors are able to run more sophisticated sensor data processing algorithms to achieve more accurate results. Alternatively, some vehicles in the group of vehicles 200 may have higher network bandwidths and can access a server to obtain more computation resources for determining the object. In a further example, the vehicle 210a may select vehicles of an auto maker the same as the vehicle 210a which the vehicle 210a trusts more than other vehicles.

Accordingly, the processors 211a-211n of the group of vehicles 200 may be configured to exchange information required for selection of vehicles in advance of the collective determination process. The information may include computation capability, computation resources, makers of vehicles, and the like. Profiles corresponding to each vehicle including the information can be stored in a memory in each of the group of vehicles 200.

Assuming the vehicles 210b-210d are selected to take part in the collective determination process, the sensor data and the first conclusion are transmitted to the vehicles 210b-210d from the vehicle 210a.

During a second phase of the collective determination process, the selected surrounding vehicles 210b-210d process the sensor data to obtain a second conclusion of determining the object. For example, at the vehicle 210b, the processor 211b receives the sensor data and process the sensor data with a second algorithm. The processor 211b may have higher computational power than the processor 211a, and the second algorithm may be more sophisticated than the first algorithm employed at the vehicle 210a. As a result, a more accurate result of determining the object may be obtained. Similarly, at vehicles 210c and 210d, the processors 211c and 211d can processes the sensor data with respective objection determination algorithms to reach second conclusions. Subsequently, the processors 211b-211d may broadcast respective second conclusions to surrounding vehicles including the first vehicle and the selected vehicles 210b-210d.

During a third phase of the collective determination process, a final conclusion of determining the project can be obtained based on the first conclusion obtained at the vehicle 210a and second conclusions obtained at the vehicles 210b-210d. For example, the vehicle 210a receives second conclusions from the surrounding vehicles 210b-210d, and determines the object based on the first conclusion and the second conclusions. For another example, the vehicle 210b receives second conclusions broadcasted from the vehicles 210c and 210d, and determines the object based on the first conclusion, the second conclusion obtained by itself, and the second conclusions received from the vehicles 210c and 210d. Similarly, the vehicles 210c and 210d can draw a final conclusion of determining the object. In this way, a sensed object at one vehicle can be collectively determined with assistance of multiple vehicles in the group of vehicles.

The final conclusion at each vehicle can then be used for autonomous driving operations in respective vehicles operating in fully autonomous mode. Accordingly, the group of vehicles 200 may collectively react to a detected object. For example, the group of vehicles 200 are traveling as a platoon. When an object is detected, for example, a construction site on a road, each member of the group of vehicles 200 may lower its speed while passing the construction site.

In one example, a weighted determination process is performed during the third phase to reach a final conclusion of determining the object. Specifically, the processors 211a-211d are configured to first associate a weight with a first or second conclusion and subsequently calculate a final decision based on the weighted first or second conclusions. A weight represents a confidence level or a trust level associated with respective conclusions. The weights can be determined based on one or more factors. For example, a vehicle may trust vehicles having a same auto maker than vehicles from other auto makers, thus giving a higher weight to a conclusion obtained at a vehicle from the same manufacturer. In another example, vehicles with more computation resources may gain higher confidence from surrounding vehicles. Accordingly, conclusions from vehicles with more computation resources may receive a higher weight.

In a further example, a weight corresponding to a vehicle is determined by a reputation of the respective vehicle. For example, a reputation of a vehicle can be determined according to a history of successful or failed computations of the vehicle. For example, multiple collective determination processes can be performed at a vehicle which may make records of itself and surrounding neighbor vehicles. The records can include numbers of correct or wrong conclusions made by itself and a neighbor vehicle compared with final conclusions of each collective determination process. Based on the records, a reputation can be calculated. For example, a percentage of successful conclusions among all conclusions made by itself or a neighbor vehicle can be used for indicating a reputation of itself or the neighbor vehicle.

In an even further example, a weight assigned to a conclusion is a combination of a first weight determined by a first vehicle generating the conclusion and a second weight determined by a second vehicle receiving the conclusion. For example, the first vehicle can perform an algorithm to determine an object and reach a conclusion. At the same time, a first weight indicating a confidence associated with the conclusion is also obtained. The second vehicle receives the conclusion and assigns a second weight to the conclusion. For example, the second weight can be determined based on factors of computation resources, manufacturers, or reputations of the first vehicle. Subsequently, a combination of the first and second weights, for example, an average of the two weights, can be calculated to obtain a combined weight for the conclusion.

As described above, profiles corresponding to members of the group of vehicles can be established and stored in a memory in advance of the collective determination process. The profiles may include information or parameters required for determine a weight for a conclusion obtained at respective vehicles. Accordingly, the processors 211a-211d can be configured to determine the weights for the first and second conclusions based on the profiles.

After a weight is determined and associated with each first and second conclusion, the processors 211a-211d may calculate a final decision for determining the object. For example, at the vehicle 210a, three second conclusions are received from vehicles 210b-210d. The three second conclusions can be represented with a respective value 1, 1, −1, indicating the results of the determination, where 1 indicates a conclusion that the object is a non-functional vehicle, while −1 indicates a conclusion that the object is not a non-functional vehicle. Based on profiles corresponding to the vehicles 210a-210d, three weights, 1, 0.5, and 0.5, may be determined to be associated with the three respective values 1, 1, and −1. In addition, the first decision may be represented by 1 indicating the determination of a non-functional vehicle and associated with a weight of 1. Accordingly, the processor 211a can aggregate the weighted values to calculate a final decision in the following way, $$\text{Value of the final conclusion} = 1 \times 1 + 1 \times 0.5 + (-1) \times 0.5 = 1.$$

Thereafter, the processor 211a may compare the aggregated value with a threshold, such as 0, to obtain a final conclusion of determining the object. In this example, as the aggregated value is greater than the threshold, the processor 211 may determine that the object is a non-functional vehicle. In a similar way, the processors 211b-211d at vehicles 210b-210d may draw a final conclusion based on first conclusions and second conclusions received from surrounding vehicles.

Figure 3:
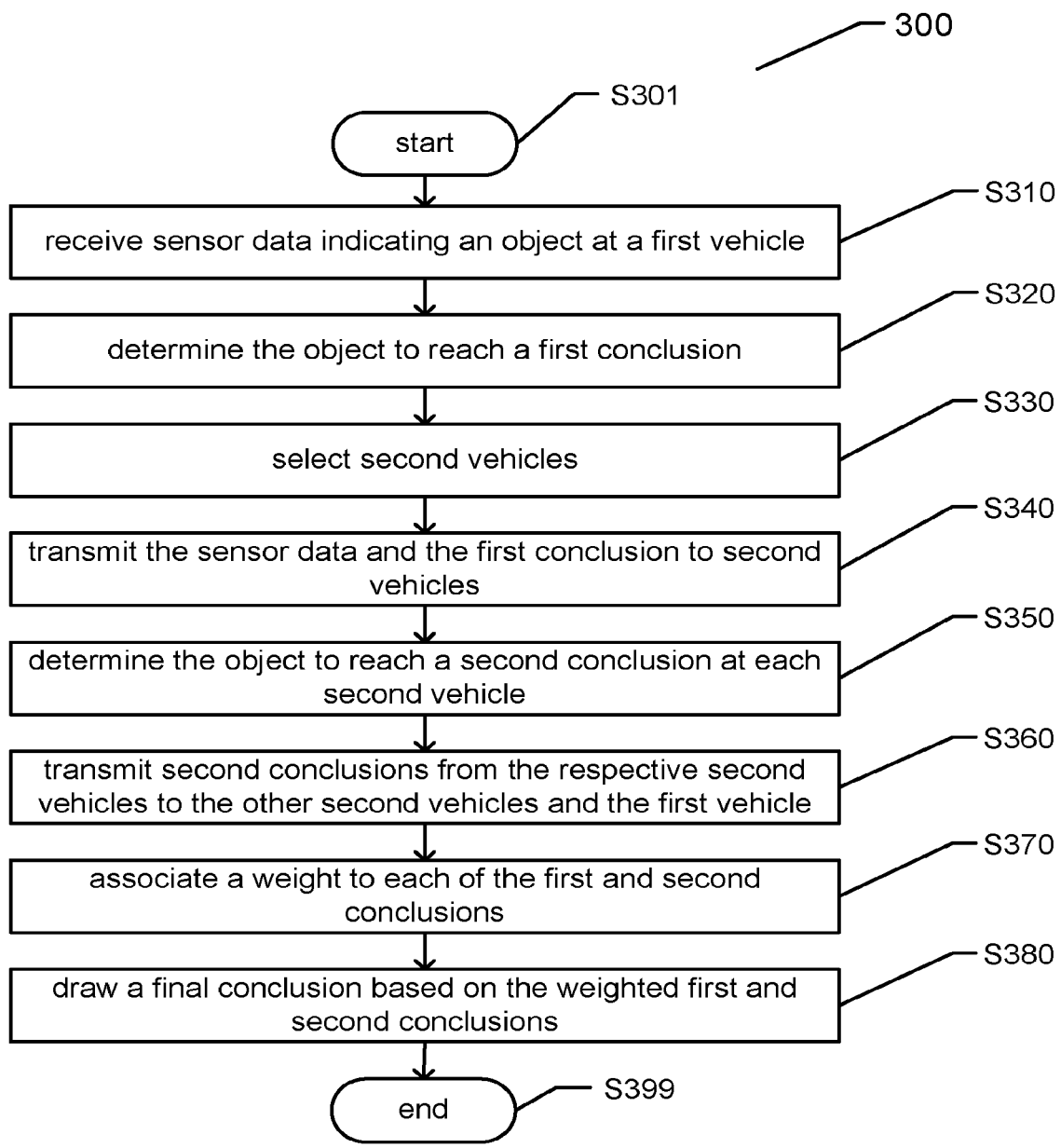
FIG. 3 shows a flowchart of a collective determination process according to an embodiment of the disclosure.

FIG. 3 shows a flowchart of a collective determination process 300 according to an embodiment of the disclosure. The process 300 starts at S301 and proceeds to S310.

At S310, sensor data indicating an object is received from sensors at a first processor in a first vehicle. For example, the object may be a construction site, and the sensor data may be generated from one or multiple sensors.

At S320, the first vehicle determines what object has been detected, and a first conclusion is drawn based on the sensor data. The determination operation may be performed by the first processor with a first algorithm.

At S330, one or more second vehicles are selected from a group of vehicles surrounding the first vehicles. The selected second vehicles will take part in the collective determination process. The selection can be based on one or more factors, such as computational power or resources, communication delays, makes of the vehicles, and the like.

At S340, the sensor data and the first conclusion are transmitted or broadcasted to the selected second vehicles.

At S350, each second vehicle determines the object based on the received sensor data to reach a second conclusion. The second vehicles may have different computational capabilities and may run different algorithms.

At S360, each of the second vehicles broadcasts the respective second collusion to surrounding vehicles including other selected second vehicles and the first vehicle.

At S370, a weight is associated with each of the first and second conclusions at the first or second vehicles. The weight represents a confidence of how much a conclusion can be trusted. Each weight corresponds to a first or second vehicle, and, for example, can be determined according to a profile of the respective vehicle. The profile may include information indicating properties or characteristics of the respective vehicle, for example, the computation resources, and/or make of the respective vehicle.

At S380, a final conclusion of determining the object is drawn based on the weighted first and second conclusions at the first vehicle or selected second vehicles. The process 300 then proceeds to S399 and terminates at S399.

Figure 4:
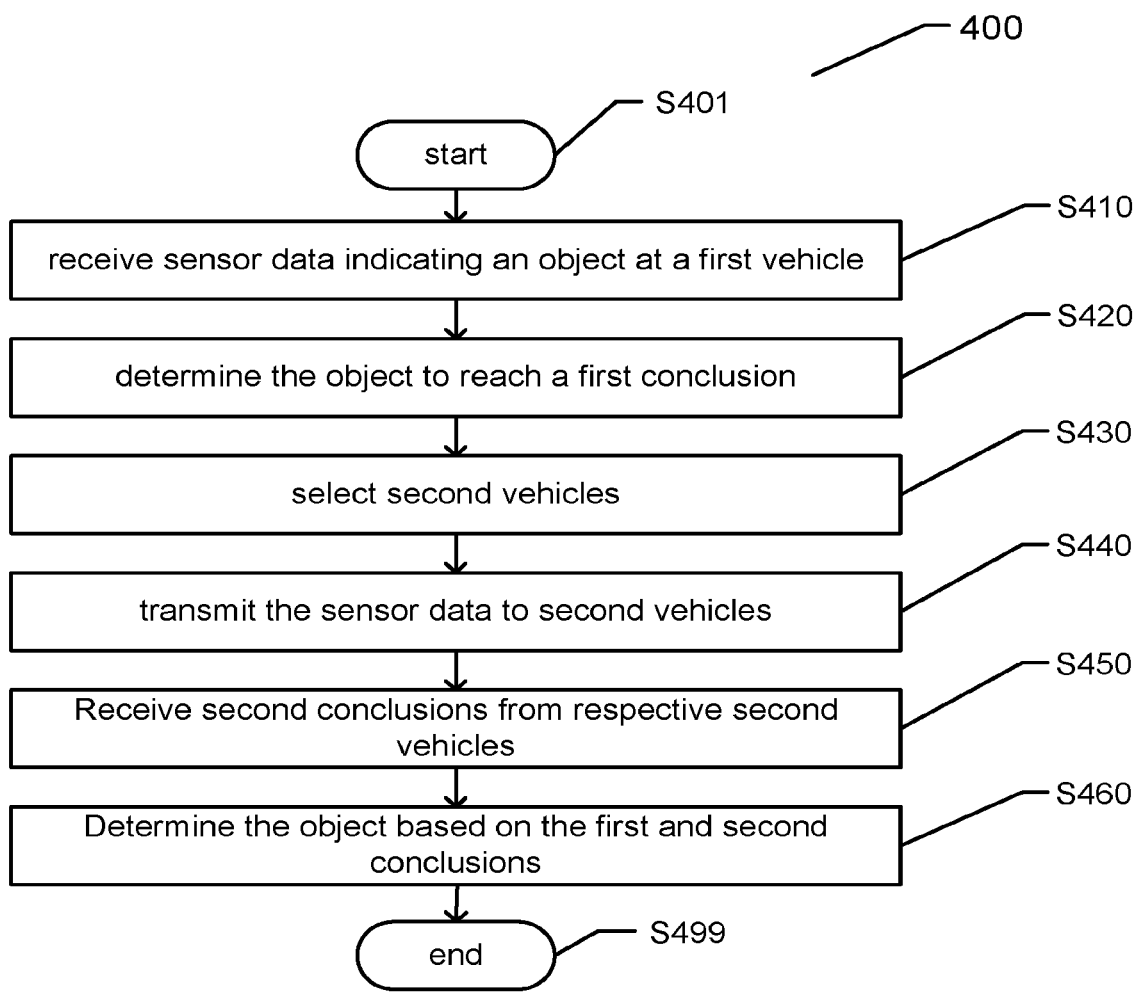
FIG. 4 shows a flowchart of another collective determination process according to an embodiment of the disclosure.

FIG. 4 shows a flowchart of a collective determination process 400 according to an embodiment of the disclosure. The process 400 can be performed at the vehicle 210a in FIG. 2 example that captures appearance of an object and generates sensor data indicating the object, and subsequently requests surrounding vehicles to assist determination of the object. The process 400 starts at S401 and proceeds to S410.

At S410, sensor data indicating an object can be received at a processor in a first vehicle.

At S420, the first vehicle determines the object to reach a first conclusion.

At S430, second vehicles are selected from a group of surrounding vehicles to take part in the collective determination.

At S440, the sensor data is transmitted to the selected second vehicles. The second vehicles may determine the object to reach second conclusions, respectively.

At S450, the second conclusions are received from respective second vehicles at the first vehicle.

At S460, the first vehicle determines the object based on the first and second conclusions. The weighted determination process described above may be performed to reach a final conclusion. The process 400 proceeds to S499, and terminates at S499.

Figure 5:
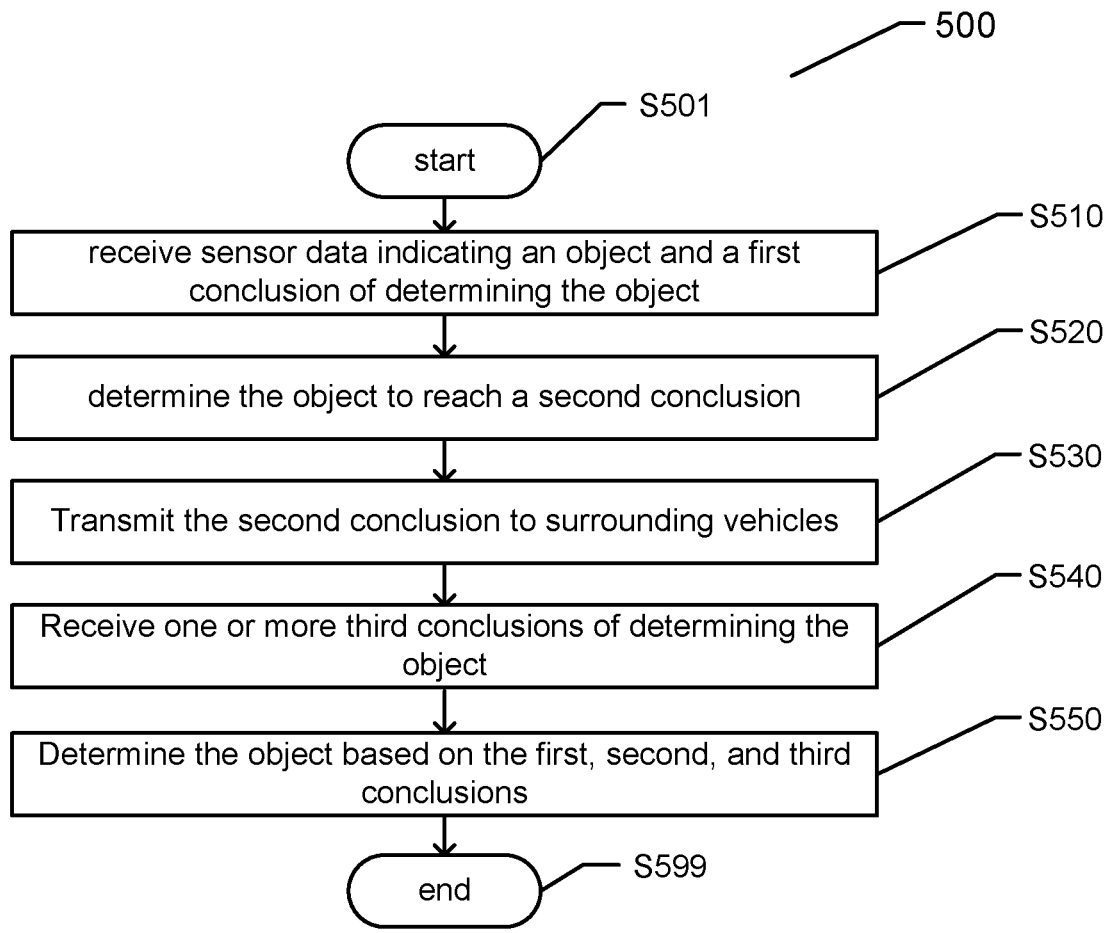
FIG. 5 shows a flowchart of a further collective determination process according to an embodiment of the disclosure.

FIG. 5 shows a flowchart of a collective determination process 500 according to an embodiment of the disclosure. The process 500 can be performed at the vehicles 210b-210d that receive sensor data indicating an object from the first vehicle 210a, and draw a conclusion of determining the object based on the sensor data. The process 500 starts at S501, and proceeds to S510.

At S510, sensor data indicating an object and a first conclusion of determining the object based on the sensor data are received at a second vehicle from a first vehicle.

At S520, the second vehicle determines the object based on the sensor data to reach a second conclusion.

At S530, the second conclusion is transmitted to surrounding vehicles from the second vehicle. The surrounding vehicles may also have received the sensor data indicating the object and drawn a conclusion of determining the object.

At S540, one or more third conclusions of determining the object are received from the surrounding vehicles at the second vehicle.

At S550, the second vehicle determines the object to reach a final conclusion based on the first, second, and third conclusions. The weighted determination process described above can be performed. The process 500 proceeds to S599, and terminates at S599.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving sensor data indicating an object at a first vehicle belonging to a group of vehicles communicating with each other;
   determining the object to reach a first conclusion based on the sensor data;
   selecting second vehicles of the group of vehicles based on computational resources available in the second vehicles, each vehicle of the group of vehicles having different computational resources;
   transmitting the sensor data to the selected second vehicles in the group of vehicles, the second vehicles determining the object to reach respective second conclusions based on the sensor data;
   receiving the second conclusions from respective second vehicles; and
   determining the object based on the first and second conclusions,
   wherein each of the first vehicle and the second vehicles uses a different algorithm to determine the first conclusion and the second conclusions, respectively,
   wherein the selected second vehicles are selected based on having more computation resources than other vehicles in the group of vehicles.

2. The method of claim 1, wherein the second vehicles are also selected based on having lowest communication delays to the first vehicle.

3. The method of claim 1, wherein the second vehicles are selected based on having the same make as the first vehicle.

4. The method of claim 1, wherein determining the object based on the first and second conclusions includes:
   associating a weight to each of the first and second conclusions; and
   drawing a final conclusion based on the weighted first and second conclusions.

5. The method of claim 4, wherein the weight is determined based on one of,
   computation resources of the vehicle drawing the respective conclusion,
   a reputation of the vehicle drawing the respective conclusion, or a combination of a first weight for a second conclusion determined by the first vehicle and a second weight determined by a second vehicle generating the second conclusion.

6. A method, comprising:

receiving, at a second vehicle, sensor data indicating an object and a first conclusion of determining the object based on the sensor data from a first vehicle, the first and second vehicles belonging to a group of vehicles communicating with each other, each vehicle in the group of vehicles having different computational resources, the second vehicle being selected for receipt of the sensor data based on computational resources of the second vehicle;

determining the object to reach a second conclusion based on the received sensor data; and transmitting the second conclusion from the second vehicle to ones of the group of vehicles, wherein the first conclusion and the second conclusion are determined using different algorithms, and wherein the second vehicle is selected based on having more computation resources than other vehicles in the group of vehicles.

7. The method of claim 6, further comprising:

receiving a third conclusion of determining the object based on the sensor data from a third vehicle of the group of vehicles, the third vehicle determining the object to reach the third conclusion based on the sensor data received from the first vehicle; and determining the object based on the first, second, and third conclusions at the second vehicle.

8. The method of claim 7, further comprising:

receiving third conclusions of determining the object based on the sensor data from third vehicles of the group of vehicles, the third vehicles determining the object to reach respective third conclusions based on the sensor data received from the first vehicle; and determining the object based on the first, second, and third conclusions at the second vehicle.

9. The method of claim 8, wherein determining the object based on the first, second, and third conclusions at the second vehicle includes:

associating a weight to each of the first, second and third conclusions; and drawing a final conclusion based on the weighted first, second, and third conclusions.

10. The method of claim 9, wherein the weight is determined based on one of, computation resources of the vehicle drawing the respective conclusion, a reputation of the vehicle drawing the respective conclusion, or a combination of a first weight for a second conclusion determined by the first vehicle and a second weight determined by a second vehicle generating the second conclusion.

11. A method, comprising:

receiving sensor data indicating an object at a first vehicle of a group of vehicles communicating with each other;

determining the object to reach a first conclusion based on the sensor data at the first vehicle;

selecting second vehicles of the group of vehicles based on computational resources available in the second vehicles, each vehicle in the group of vehicles having different computational resources;

transmitting the sensor data and the first conclusion to the selected second vehicles of the group of vehicles from the first vehicle;

determining the object to reach a second conclusion at each second vehicle based on the sensor data;

transmitting second conclusions from the respective second vehicles to the other second vehicles and the first vehicle; and determining the object based on the first and second conclusions at the first vehicle or the second vehicles, wherein the first conclusion and the second conclusions are determined using different algorithms, and wherein the selected second vehicles are selected based on having more computation resources than other vehicles in the group of vehicles.

12. The method of claim 11, wherein the second vehicles are also selected based on having lowest communication delays to the first vehicle.

13. The method of claim 11, wherein the second vehicles are selected based on having the same make as the first vehicle.

14. The method of claim 11, wherein determining the object based on the first and second conclusions at the first vehicle or the second vehicles includes:

associating a weight to each of the first and second conclusions; and drawing a final conclusion based on the weighted first and second conclusions.

15. The method of claim 14, wherein the weight is determined based on one of, computation resources of the vehicle drawing the respective conclusion, a reputation of the vehicle drawing the respective conclusion, or a combination of a first weight for a second conclusion determined by the first vehicle and a second weight determined by a second vehicle generating the second conclusion.

* * * * *